United States Patent Office 2,859,240

Patented Nov. 4, 1958

2,859,240

PRODUCTION OF ACRYLATES BY CATALYTIC DEHYDRATION OF LACTIC ACID AND ALKYL LACTATES

Reynold E. Holmen, White Bear Township, Ramsey County, Minn., assignor to Minnesota Mining & Manufacturing Company, St. Paul, Minn., a corporation of Delaware No Drawing. Application January 12, 1956
Serial No. 558,607

4 Claims. (Cl. 260—486)

This invention is concerned with the production of acrylates, including acrylic acid as well as its lower alkyl esters, from corresponding lactates by a direct catalytic process at an elevated temperature.

This application is a continuation-in-part of my co-pending application Serial No. 319,185, filed November 6, 1952, now abandoned.

The acrylates comprise a class of materials which are of great industrial importance due to their ability to form polymers and copolymers having a wide range of applications. The relatively high cost of the acrylates has, however, been a deterrent to their use in many applications for which their physical and chemical properties are well suited. The high cost of these materials has been in part a result of the methods of preparation previously available, involving multiple-step processes, use of large amounts of auxiliary reagents, and other inefficiencies. The development of new and more efficient processes for the production of acrylates has therefore long been an objective of those working in this field.

The oxidation of acrolein by means of silver oxide was formerly employed in producing acrylic acid, from which other acrylates could then be obtained. The silver oxide reagent was expensive and was reduced to the metal during the reaction, requiring reconversion to silver oxide prior to re-use.

Hydrolysis of ethylene cyanhydrin or of acrylonitrile provides much of the acrylates now produced commercially. Neither intermediate is low in cost. Considerable quantities of acidic reagents are required.

Another method of preparation involves the pyrolysis of polymeric beta-lactone produced from ketene and formaldehyde. Several separate reactions are involved, including lactone formation, polymerization, and pyrolysis.

Acrylates have been synthesized from acetylene, carbon monoxide and water or alcohol; but this process has not achieved commercial importance. Recovery of expensive catalyst presents a major problem.

The dehydration of hydracrylic acid (beta-hydroxypropionic acid) or alkyl esters thereof to the corresponding acrylate is a comparatively simple and economical process, but the starting material is neither low in cost nor readily available in quantity. Alpha-hydroxypropionic acid (lactic acid) is much more readily and potentially available, but this material, as such, has never been found to be an effective source of acrylates.

When heated at moderate temperatures, lactic acid readily converts to polylactic acid or lactides. For example, Whitmore, "Organic Chemistry," in discussing the preparation of acrylic acid, states: "It is not obtained from lactic acid or its esters which give a lactide instead." At higher temperatures, lactic acid and its esters have been shown by Nef, and more recently by Fisher and Filachione of the U. S. Dept. of Agriculture, to decompose into acetaldehyde, carbon monoxide, and water or alcohol; a reaction which is typical of aliphatic alpha-hydro-alpha-hydroxy acids. This same decomposition to an aldehyde having one less carbon atom in the carbon chain is also typical of procedures known to the prior art in which lactic acid or the like is heated in the presence of strong acids such as sulfuric or phosphoric acid.

In view of such prior art experience, it is not surprising that any methods for the preparation of acrylates based on lactic acid or its esters as a raw material have invariably involved the preliminary replacement of the alpha-hydroxy hydrogen (and the carboxyl hydrogen, when present) by some other radical whereby lactide formation and decomposition could be avoided, followed by pyrolysis of the substituted lactate to the acrylate. Typical of such methods is the acetylation of methyl lactate to methyl alpha-acetoxy propionate followed by pyrolysis to methyl acrylate and acetic acid.

Thus, despite the ready availability of lactic acid and the obvious advantages attendant upon its use, and further despite the very considerable efforts applied by researchers toward a solution of the problem, the fact remains that no one, prior to the present invention, ever succeeded in directly converting lactates to acrylates. See, for example, the review by C. H. Fisher et al. entitled "Properties and Reactions of Lactic Acid" and published by the U. S. Dept. of Agriculture, No. A1C-279, October 1950.

It has now been discovered, contrary to all previous experience, that lactate material, i. e., lactic acid and the lower alkyl esters thereof, may be converted in significant yields to acrylate material by direct catalytic dehydration at temperatures within the range of about 200°–600° C., or more particularly at temperatures within the more restricted and generally preferred range of about 250°–550° C.

This is particularly surprising with respect to lactic acid itself. Atwood, in his Patent No. 2,464,364, for example, finds it necessary to remove all traces of lactic acid from his mixture of alkyl lactate and acetic anhydride in order to prevent excessive coke formation in the pyrolyzing furnace.

Specific examples will now be set forth in further explanation, but with no intent of limitation, of the invention.

EXAMPLE 1

A catalyst was made by pelleting $NaH_2PO_4.H_2O$ mixed with one-fourth its weight of graphite as a lubricant. Other lubricants, e. g., sodium stearate, are equally effective in providing coherent pellets. The amount of lubricant may be much less than here indicated.

A quantity of the catalyst pellets having an apparent volume of about 65 ml. was used to pack a 10" section of a 1⅛" O. D. "Pyrex" glass combustion tube passing through a "Hoskins" electrically heated tube furnace supported vertically. The furnace temperature was slowly raised so as to remove combined water without fusing the catalyst mass. A dropping funnel having provision for admitting inert gas and for pressure equalization was attached to the top of the combustion tube by means of a ground glass joint. The bottom end of the combustion tube led directly to a water-cooled receiver, from which non-condensed material passed through a Dry-Ice trap and finally through a bubble counter. Oxygen-free nitrogen was fed into the system at the dropping funnel at a rate of about 0.1 cubic foot per hour in order to maintain an inert atmosphere and to assist in sweeping the feed material and products through the train.

Methyl lactate was fed from the dropping funnel onto the dehydrated heated catalyst at a rate of about one drop per 4–5 seconds, and samples of the condensate were withdrawn from the receiver at each of several furnace temperatures within the range of 270°–540° C.

In this as well as the following examples, the furnace temperature was obtained by means of a thermocouple which contacted the outer surface of the combustion tube within the area of maximum temperature. The temperature differential between such surface and the center of the catalyst column was not more than about 25° C. Temperatures were recorded in degrees Fahrenheit and could be maintained at plus or minus about 5° F., but for convenience are here reported in degrees centigrade corresponding to the average recorded temperature.

The condensate contained methyl acrylate. After standing at room temperature for about two weeks it was found that polymerization of the methyl acrylate had caused an increase in the viscosity of the samples, particularly those taken at 510°–532° C.

EXAMPLE 2

A 9 inch section of the combustion tube of the apparatus described in Example 1 was packed with 6–10 mesh granules of a catalyst material prepared by mixing a concentrated solution of $Na_2SO_4$ with finely divided $CaSO_4$ in a 1:25 mol ratio to form a stiff paste which was dried in a thin layer, broken into small pieces, and screened. A short upper section of the combustion tube was filled with "Pyrex" glass helices for preheating the feed. An aqueous 10% solution of lactic acid was fed into the tube at 10–15 ml. per hour, the furnace temperature being 400° C. The condensate recovered was fractionated and an aqueous fraction was obtained which on analysis was found to contain acrylic acid in an amount equal to 68% of theoretical based on the amount of lactic acid employed.

EXAMPLE 3

Barium phosphate having the nominal formula $Ba_3(PO_4)_2$ was produced by precipitation from a solution of barium chloride with a solution of diammonium phosphate $(NH_4)_2HPO_4$ and ammonium hydroxide. The precipitate was washed free of chloride ion and was dried and granulated as in Example 2. The combustion tube was packed with a 3 inch section of the catalyst particles and with glass helices for preheating. At a furnace temperature of 425° C. and a feed rate of about 29 ml. per hour, an aqueous 50% solution of lactic acid provided a 47.8% yield of acrylic acid.

EXAMPLE 4

Analytical grade finely powdered barium sulfate was granulated by slurrying and drying, and a 9 inch section was employed in the combustion tube as the catalyst for pyrolysis of methyl lactate. At 350° C. and a feed rate of 10–15 ml. per hour of the liquid ester, 28.4% of the ester was converted to methyl acrylate and 17.4% to acrylic acid, the total conversion thus being 45.8%.

EXAMPLE 5

An aqueous 50% solution of lactic acid was converted to acrylic acid in 50.7% yield by the action, at a furnace temperature of 425° C. and in the apparatus of Example 1, of a granular catalyst mixture prepared from $CaSO_4$ and $Na_4P_2O_7$ in 25:1 mol ratio. Feed rate was 17.2 ml. per hour and the catalyst bed was 3 inches in length, with a short preheater section just preceding the catalyst.

EXAMPLE 6

Ethyl lactate was passed through the catalyst bed as in Example 1. The furnace temperature was 454° C. From 83 ml. of ethyl lactate there was condensed 70 g. of liquid in the water-cooled receiver. A 37 g. portion of this was roughly fractionated to give 2.2 g. to 50° C., 4.2 g. from 50–76° C., 9.9 g. from 76–83° C., 1 g. from 83–120° C. plus 19.2 g. residue. The fractions boiling from 50–76° C. and from 76–83° C. were combined and redistilled. A portion weighing 6.8 g., boiling from 70–77° C., and containing chiefly ethanol and ethyl acrylate, began to show polymerization after a few hours in the sunlight. The slightly viscous liquid was allowed to evaporate, leaving a film of clear polyethylacrylate. The identity of the polymer was confirmed by infrared absorption analysis.

EXAMPLE 7

In this experiment butyl lactate was passed over a pelleted catalyst which was prepared, in accordance with the procedure described under Example 1, from lithium hydrogen phosphate mixed with some graphite. The furnace temperature was 510° C. From 14 ml. of butyl lactate there was obtained 6.2 g. of nearly water-white pyrolysate. After adding a few granules of benzoyl peroxide and warming for thirty minutes on a water bath the acrylate in the pyrolysate polymerized to give a viscous liquid. The clear solid isolated by evaporation of the volatile material was identified as chiefly polyacrylic acid, and butene was identified in the residue recovered in the Dry-Ice trap, indicating that at the temperature used the butyl acrylate first formed was further pyrolyzed to butene and acrylic acid.

EXAMPLE 8

In this experiment lactic acid was directly dehydrated to acrylic acid. A solution of 70 ml. of 85% lactic acid in 30 ml. of water was passed at 482° C. furnace temperature over catalyst pellets prepared, as in Example 1, from sodium dihydrogen phosphate mixed with one-fourth its weight of graphite as a lubricant, and further treated by soaking in a mixture of 6 ml. of 85% phosphoric acid and 70 ml. isopropanol for thirteen minutes before drying for use. From 15 ml. of feed was obtained 14.6 g. pyrolysate in the water-cooled condenser. This was distilled to give 10 g. boiling to 100° C. and 4 g. from 100–103° C. The latter fraction was found by ultraviolet absorption analysis of a sample to contain about 30% of acrylic acid. This was further demonstrated by adding to another sample a small amount of calcium carbonate followed by sodium sulfite and sodium persulfate. After a short induction period a precipitate of polymerized calcium acrylate appeared and coagulated to a sticky ball of polymer.

EXAMPLE 9

This experiment was carried out as previously described using methyl lactate as the feed and a catalyst prepared by carefully heating a mixture of barium hydrogen phosphate and graphite. At 454° C. a 15% conversion of methyl lactate to methyl acrylate was obtained, calculated from the ester content of the product fraction boiling up to 70° C.

The catalyst was prepared by first dissolving 39.5 g. of $BaCO_3$ in a mixture of 30 ml. of water and 27.6 g. of 85% $H_3PO_4$; this product was mixed with 50 g. of graphite and then dried at 125° C. before it was broken into small lumps and placed in the reaction tube for further heating.

EXAMPLE 10

A catalyst prepared by the method of Example 9 from 38.6 g. of tertiary zinc phosphate, 13.8 g. of 85% $H_3PO_4$, and 40 g. of graphite gave about a 7% conversion of methyl lactate to methyl acrylate at 454° C. furnace temperature.

EXAMPLE 11

Methyl lactate was passed over a catalyst made from about 200 ml. of granular bone charcoal which on analysis showed 81.8% ash and which was treated with 5 g. of 85% $H_3PO_4$ in 100 ml. isopropanol before drying for use. The bone charcoal contained a large amount of calcium as well as significant amounts of sodium and phosphorus, in the form of salts. At a furnace temperature of 343° C. a 20% conversion of the methyl lactate to methyl acrylate was effected as determined by the ester content of the product fraction.

EXAMPLE 12

In this experiment methyl lactate was passed over silica gel which had been impregnated with about 35–40% by weight of monosodium phosphate and heated. At a furnace temperature of 343° C. a 20% conversion to methyl acrylate was obtained. As little as about 25% of the phosphate was equally effective.

When silica gel without the monosodium phosphate was similarly tested as a catalyst, no significant yield of acrylate was obtained.

The following tabulation provides significant data on a number of additional experiments in which methyl lactate was catalytically dehydrated in the absence of oxygen in an apparatus as described under Example 1 and at the furnace temperature indicated. The catalyst in each case was prepared by combining the indicated components and preliminarily heating the mixture slowly to the indicated temperature in the "Pyrex" tube, any evolved water being removed from the system. The silica gel or equivalent serves to increase the active surface area of the catalyst.

*Dehydration of Methyl Lactate*

| Example | Catalyst | Furnace Temperature, ° C. | Results |
|---|---|---|---|
| 13 | $LiH_2PO_4$—0.02 mol; Silica Gel—50 g | 400 | 14% conversion to methyl acrylate. |
| 14 | $CsH_2PO_4$—0.02 mol; Silica Gel—50 g | 343 | 22% conversion to methyl acrylate. |
| 15 | $KH_2PO_4$—0.02 mol; Silica Gel—50 g | 343 | 15% conversion to methyl acrylate. |
| 16 | $CaHPO_4$—100 g; $(NH_4)_2HPO_4$—10 g; Graphite—10 g | 532 | 9% conversion to methyl acrylate. |
| 17 | $MgSO_4$—71 g; $Na_2HPO_4$—60 g; Graphite—28 g | 400 | more than 11% conversion to methyl acrylate. |
| 18 | $NaH_2PO_4.H_2O$ on "Darco" Granules | 427 | 23% conversion to methyl acrylate. |
| 19 | $NaH_2PO_4.H_2O$—0.5 mol; $Na_2HPO_4$—0.5 mol; Graphite—30 g | 482 | 17% conversion to methyl acrylate. |
| 20 | $NaH_2PO_4.H_2O$—80 g; Graphite—20 g; $H_3PO_4$ to adjust pH to about 3.5 | 454 | 17% conversion to methyl acrylate + considerable acrylic acid (25% as determined by unsaturation). |
| 21 | $NaH_2PO_4.H_2O$—10 g; $Na_2WO_4$—1 g; $H_3PO_4$—1.7 g (on "Columbia Carbon SXA" pellets). | 270–343 | 10–13% conversion to methyl acrylate. |
| 22 | $CaSO_4$ (soluble anhydrite) | 400 | 20% conversion to methyl acrylate. |

In the above table, "Darco" and "Columbia Carbon SXA" are commercial varieties of activated carbon analyzing, respectively, 19.7% and 0.9% ash. The silica gel produced a residue of 0.15% on evaporation with HF and $H_2SO_4$. These materials are employed as carriers for the alkali or alkaline earth phosphate or sulfate catalyst materials. The $Na_2WO_4$ included in the catalyst of Example 21 is seen to decrease the yield of acrylate product.

The percentage conversion of methyl lactate to methyl acrylate reported in the examples, unless otherwise indicated was determined on the basis of the saponification equivalent. The product from the catalytic dehydration was first distilled through an unpacked column of about 12 inch length and about 6 mm. inside diameter. The fraction distilling at 50–85° C., containing the methyl acrylate together with a quantity of methanol, was treated with alcoholic KOH to saponify the acrylate. From the results thus obtained, the percent of the initial amount of methyl lactate which had been converted to methyl acrylate was calculated. The method of analysis was checked by analysis of known mixtures of methyl acrylate, methyl lactate and methyl alcohol and found to be highly accurate in the absence of other low-boiling esters. In doubtful cases the results of the saponification test were further checked by means of ultraviolet absorption curves, and/or by iodine back-titration of dodecyl mercaptan added in excess, in accordance with the procedure described by Bessing et al., Anal. Chem., vol. 21, page 1073 (1949). Where the product comprises acrylic acid, the quantity of this material is determined in known manner, e. g., by bromine addition after removal of other unsaturates. Acrylic acid has also been determined by ultraviolet absorption and by solids determination after polymerization.

EXAMPLE 23

Butyl lactate was substituted for methyl lactate as the feed, other conditions being the same as for Example 21, The distillate contained a mixture of butyl acrylate and acrylic acid which polymerized on standing.

EXAMPLE 24

Butyl lactate was also pyrolyzed by dispersing a powdered mixture of 6 grams of $Na_2HPO_4$ and 4 grams of $MgSO_4$ in 100 ml. of "Stanolind" white mineral oil, heating the mixture to 350° C., and adding the butyl lactate dropwise while maintaining the temperature and with constant stirring. A portion of the distilled product boiling over the range of 140–150° C. contained acrylic acid which could be polymerized. The identity of the polymer was confirmed by infrared absorption analysis.

EXAMPLE 25

Ammonium lactate has also been prolyzed in accordance with the principles of the invention. Employing 38% aqueous ammonium lactate solution as the feed, with a catalyst prepared from $NaH_2PO_4$ and "Darco" activated carbon granules as in Example 18, and with a furnace temperature of 454–510° C., there was obtained a product from which the neutral fraction, boiling up to 98° C., was isolated. The presence of acrylonitrile in this fraction was indicated by infrared absorption analysis.

EXAMPLE 26

A catalyst mass was prepared by soaking 80 ml. of commercial 4–8 mesh activated alumina in 40 ml. of an aqueous solution made from 27 grams of hydrous aluminum sulfate containing 27% water, and 20 grams of magnesium sulfate, dissolved in 180 ml. of distilled water, and then carefully drying the treated granules at 480° C.

The catalyst mass was placed in the reactor tube of Example 1 and ethyl lactate was introduced, together with nitrogen as the inert carrier. The furnace temperature was held at 300–360° C. The product was fractionated. The portion boiling at 54–88° C. contained ethyl acrylate, which polymerized on standing. The polymer was further identified by infrared absorption analysis as polyethylacrylate.

EXAMPLE 27

At a furnace temperature of 343° C., methyl lactate was passed at a feed rate of 0.30 ml. of liquid per ml. of catalyst per hour over a pelleted catalyst prepared from 50 grams of $CaSO_4$ ("soluble anhydrite") and 0.01 mol $NaH_2PO_4.H_2O$, in the presence of the customary inert atmosphere. Analysis of the fractionated product indicated a 5% conversion to methyl acrylate and about 21% conversion to acrylic acid.

Calcium sulfate dihydrate ($CaSO_4.2H_2O$) may be used in place of the anhydrous material in preparing the catalyst mass.

EXAMPLE 28

In this example the mol ratio of $CaSO_4$ to $NaH_2PO_4.H_2O$ in the catalyst mass was changed to 3:1. With the furnace at 371° C., a solution of methyl lactate in twice its weight of methanol was introduced, to provide a product fraction boiling at 50°–85° C. containing methyl acrylate in an amount representing at least about 40% conversion.

EXAMPLE 29

Methyl lactate was contacted with a pelleted catalyst prepared from sodium ferric pyrophosphate mixed with 2% of sodium stearate as a lubricant, stearic acid being removed during preliminary heating. The furnace temperature was 400° C. The conversion to methyl acrylate was about 17% as determined by the saponification equivalent of the fraction boiling at 50–85° C. On standing, the acrylate in this fraction polymerized to give a viscous solution of polymethylacrylate.

EXAMPLE 30

A catalyst mass was prepared by treating 50 grams of silica gel with 0.02 mol of $Na_2SO_4$. The mass was carefully heated in the apparatus of the preceding examples. With the furnace at 343° C., methyl lactate was passed over the catalyst. Of the total amount introduced, about 18% was converted to methyl acrylate and a considerable proportion was converted to acrylic acid, which was isolated in a fraction boiling at 105–150° C. The acrylic acid, in the form of its calcium salt, readily polymerized when the solution was treated with $Na_2S_2O_8$, $NaHSO_3$ and $CaCl_2$ and diluted 50–100% by volume with water.

EXAMPLE 31

Aqueous lactic acid of about 30% concentration was fed into the apparatus of Example 1 containing in this case a pelleted catalyst prepared from 138 grams $NaH_2PO_4.H_2O$, 12 grams $NH_4H_2PO_4$, and 37.5 grams graphite. The furnace temperature was about 532° C. A portion of the product was distilled and the aqueous fraction boiling up to 100° C. collected. This fraction contained acrylic acid. A portion was treated with $Na_2S_2O_8$, $NaHSO_3$ and $CaCl_2$, and produced in a few hours a cohesive precipitate of polycalcium acrylatepolyacrylic acid.

When methyl lactate was passed over the same catalyst at a furnace temperature of 427–482° C., the product was found to contain a quantity of methyl acrylate which was polymerizable.

When a mixture of 85% lactic acid and methanol in a 2:3 ratio by volume was fed over the same catalyst at a furnace temperature of 482° C. and a feed rate of about 0.33 ml. of liquid per ml. of catalyst per hour, there was obtained a 6% conversion to methyl acrylate.

EXAMPLE 32

Granules formed of a mixture of tricalcium phosphate $Ca_3(PO_4)_2$ and sodium pyrophosphate $Na_4P_2O_7$ in 25:1 molar ratio were employed as the catalyst mass. With the furnace at 425° C., an aqueous 50% solution of lactic acid was converted to acrylic acid in 48–52% yield. The catalyst bed was 3 inches long and the feed rate was about 31 ml. per hour.

In many of these examples the catalyst was used for long periods of time, both continuously and intermittently, with a continued high level of activity. Physical coating of the catalyst with polymeric products might be expected to occur, with resultant decrease in activity, in the case of extremely long runs; but no chemical deterioration has been observed. The action appears to be truly catalytic. A physically coated catalyst may often be regenerated by burning off the accumulated products in a stream of air at 400°–450° C.

In this connection, it will be appreciated that the catalyst as it is employed in the reaction is not necessarily in the same form, either chemically or physically, as is the catalyst mass when first charged to the reactor. Many of the catalyst materials herein specified, particularly such compounds as monosodium phosphate, disodium phosphate, primary calcium phosphate, etc. when heated are known to change to pyrophosphates, metaphosphates, polyphosphates or other modifications possessing improved stability at the temperature employed. These latter products which are considered as falling within the term "phosphates," act as true catalysts to promote a change in the reacting materials without themselves undergoing any significant permanent change.

When a catalyst mass is prepared by heating a compound or mixture which undergoes loss of water, care must be taken to prevent the solution or fusion of the mass in the process. For example, the transformation of sodium dihydrogen phosphate to the metaphosphate requires slow and cautious heating in order to obtain a non-sintered catalyst mass having adequate surface area. Admixture with a relatively inert material such as graphite is sometimes of value in achieving a catalyst mass of suitable physical condition, as will be apparent from several of the foregoing specific examples. When mixed catalysts are used, care should be taken to avoid combinations which readily fuse at the operating temperatures employed or which react to result in a crystal structure altogether and unsuitably different from that of the original active components.

The rate of feed of the lactate material to the catalyst chamber is important in obtaining best results. Too low a rate of feed is uneconomical, and too high a rate may result in inefficient contact of the reactant with the catalyst mass. The surface area and activity of a particular catalyst will dictate the optimum feed rate for any given temperature. With the apparatus described in Example 1 and the catalysts described in this specification, feed rates of about 0.06–0.35 ml. of liquid per ml. of catalyst per hour have given good results, and these values will serve as a guide. For example, with concentrations of 0.025, 0.05 and 0.1 mol of $NaH_2PO_4$ on 50 grams of silica gel, feed rates of 0.066, 0.104 and 0.22 ml., respectively produced a 16–17% conversion of methyl lactate to methyl acrylate. However the invention is not to be considered as restricted to these feed rates.

Below a furnace temperature of about 200° C. little if any dehydration is accomplished. Above about 600° C., too much undesirable decomposition takes place. This range of operating temperatures may be expanded somewhat by judicious choice of catalysts and of operating conditions, but will serve to establish a generally useful range. Within the preferred range of about 250–550° C., satisfactory rates of dehydration are obtained with a minimum of undesirable decomposition and side reactions. With the more active catalysts, temperatures not over about 400° C. are usually best, and when in addition highly porous supports such as silica gel are used, temperatures of around 300°–345° C. are indicated.

In some cases the side reactions, while they unavoidably reduce the yield of acrylates, provide highly useful by-products. Thus in some instances there have been obtained small amounts of alpha, beta-dicarbonyl compounds, chiefly biacetyl, valuable as a flavoring and as a polymerization initiator, and capable of being condensed to form the polymerization inhibitor para-xyloquinone. However the production of acrylate material remains the chief result of the processes here described.

The particular catalyst employed obviously has an effect on the type and amount of by-products formed. In general, it is found desirable to avoid catalysts having too low or too high a pH value, as well as those of pronounced oxidizing power, each of which tends to increase the proportion of side reactions ending in by-products, and/or to decrease the effective life of the catalyst. As an illustration, when a catalyst prepared from 0.01 mol $NaH_2PO_4$ and 0.04 mol $H_3PO_4$ (on 50 g. silica gel) was used, the conversion of methyl lactate to methyl acrylate fell to about ⅓ of that obtained with $NaH_2PO_4$ alone, and a considerable proportion of acetaldehyde was obtained. With $Na_3PO_4$ alone, the conversion rate is fairly high, but condensation products are produced which contaminate the acrylate product unnecessarily and tend to cause premature loss of catalyst activity. The less soluble tribasic alkaline earth phosphates provide high yields and avoid the formation of large amounts of condensation products, as has been shown in Examples 3 and 32.

The proportion of undesired products produced in the reaction may be diminished in other ways also, e. g., by feeding such undesired materials with the lactate material into the reactor. For example, in the dehydration of methyl lactate, methanol may be added to suppress the hydrolysis of the ester. A mixture of methanol and lactic acid yields a product mixture of methyl acrylate and acrylic acid.

Other catalysts found to be active in converting lactate material to acrylate material by the procedures hereinbefore described have been prepared from the following compositions by heating to operating temperatures:

$Ba_2P_2O_7$+10% graphite (pelleted)
$CaHPO_4$+10% graphite (pelleted)
$BaSO_4$+10% graphite (pelleted)
$NaHSO_4$ on silica gel (0.01 M/50 g.)
$K_2SO_4$ on silica gel (0.03 M/50 g.)

Of these the barium and calcium salts are of particular value, the former being the more so. Strontium sulfate behaves similarly to barium sulfate.

Many other compounds which have been found useful in other applications as dehydration catalysts have been found to yield little or none of the desired product when employed as substitutes for the catalysts of the present invention. Thus, such materials as silicophosphoric acid, phosphoric acid, pumice, $WO_3$, $W_2O_5$, $W_2O_5$ on Al, $TiO_2$, $Na_2WO_4$, $Na_2MoO_4$, $NaVO_3$, $MoO_3$, $Si_2O$, $Al_2O_3$, $NiMoO_2$ and $ZnMoO_3$, although widely used in other dehydration processes, either fail to give any of the desired acrylate material when employed in connection with lactate starting materials, or give such a preponderance of contaminating by-products that their employment for the present purpose is totally impractical.

As an illustration, the effect of the incorporation of sodium molybdate in a typical catalyst mass will be described. Molybdates are often recommended as dehydrating catalysts for other processes. When methyl lactate was passed over a catalyst made in the manner hereinbefore described from 50 grams of silica gel, 0.04 mol $NaH_2PO_4$ and 0.01 mol $Na_2MoO_4$, about 10% of the ester was converted to esters boiling below 85° C., and of these only about ⅕, i. e., only about 2% based on the lactate starting material, was the desired methyl acrylate.

On the other hand, a catalyst produced from 50 grams silica gel and 0.05 mol $NaH_2PO_4$, in the absence of molybdate, provided approximately a 19% conversion of the lactate to esters boiling below 85° C., of which substantially the entire amount was methyl acrylate.

On the other hand, small amounts of various other materials may be incorporated with the catalyst material to serve as promoters of the reaction. Lanthanum phosphate is one example of such a promoter; its effect is illustrated in the following tabulation showing percent conversion of 50% lactic acid to acrylic acid with granular catalyst mixtures as defined and at 425° C.

| Example | Catalyst | Percent Conversion |
|---|---|---|
| 33 | $CaSO_4$—25 mols<br>$C^{s}H_2PO_4$—1 mol | 54 |
| 34 | $CaSO_4$—25 mols<br>$LaPO_4$—1 mol | 42 |
| 35 | $CaSO_4$—25 mols<br>$CsH_2PO_4$—0.04 mol<br>$LaPO_4$—1 mol | 58 |

In general, it is found that effective results in terms of catalytic dehydration of lactates to acrylates in accordance with the principles of this invention may be obtained by the use as catalysts of the sulfates and phosphates of metals of groups I and II of the periodic table which are at least as high as cadmium in the electromotive series. Of these, the salts of the alkaline earth metals, especially of calcium, strontium and barium, provide the highest yields and are preferred. While the dehydration of lower alkyl lactates to corresponding acrylates is significant, the preparation of acrylic acid by direct catalytic dehydration of lactic acid is particularly important because of the greater economies involved in the use of aqueous lactic acid solution. The latter preparation is also particularly unexpected in the light of prior art teachings such as found in Atwood Patent No. 2,464,364, as hereinbefore noted.

The practice of this invention is not limited to fixed bed catalysts, but may be carried out with a fluidized bed when such conditions are advantageous. Similarly, variations in pressure from atmospheric to subatmospheric and to superatmospheric pressures are obvious extensions. Acid-resistant stainless steel reaction vessels may replace the "Pyrex" glass tube of the examples. Other non-inventive modifications will be apparent.

The isolation of pure acrylic acid or lower alkyl acrylates from the crude acrylate material obtained as the product of the novel process of this invention may be carried out by a combination of distillation and extraction or by any other suitable procedures such as are already well known in the art.

What is claimed is as follows:

1. The process of catalytically producing acrylate material from lactate material which comprises the steps of (1) bringing volatile lactate starting material, having the formula $CH_3CHOHCOOR$, where R is selected from the group consisting of hydrogen, $NH_4$ and alkyl containing 1–4 carbon atoms, into contact with a dehydration catalyst consisting essentially of at least one member of the group consisting of the sulfates and phosphates of metals of groups I and II which are at least as high as cadmium in the electromotive series, at a temperature within the range of 200° C. to 600° C., and (2) separating acrylate material from at least some of the reaction products.

2. The process of catalytically producing acrylates from lower alkyl esters of lactic acid which comprises the steps of (1) bringing a lower alkyl ester of lactic acid, wherein the alkyl radical contains 1–4 carbon atoms, into contact with a dehydration catalyst consisting essentially of at least one member of the group consisting of the sulfates and phosphates of metals of groups I and II which are at least as high as cadmium in the electromotive series, at a temperature within the range of 200° C. to 600° C., and (2) separating acrylate material from at least some of the reaction products.

3. The process of catalytically producing acrylic acid from lactic acid which comprises the steps of (1) bringing lactic acid into contact with a dehydration catalyst consisting essentially of at least one member of the group consisting of the sulfates and phosphates of metals of groups I and II which are at least as high as cadmium in the electromotive series, at a temperature within the range of 200° C. to 600° C., and (2) separating acrylic acid from at least some of the reaction products.

4. The process of producing acrylates from lactates which comprises directly catalytically dehydrating a lactate having the formula $CH_3CHOHCOOR$, by contact with a dehydration catalyst consisting essentially of at least one member of the group consisting of the sulfates and phosphates of metals of groups I and II which are at least as high as cadmium in the electromotive series, at a temperature within hte range of 200° C. to 600° C., and in the presence of a hydroxyl-containing compound having the formula ROH, to an acrylate having the formula $CH_2{=}CHCOOR$, where R is a member of the class consisting of hydrogen and lower alkyl radical containing 1–4 carbon atoms.

References Cited in the file of this patent

UNITED STATES PATENTS

| | | |
|---|---|---|
| 2,184,934 | Bruson et al. | Dec. 26, 1939 |
| 2,303,842 | Kirk et al. | Dec. 1, 1942 |
| 2,428,673 | Miller | Oct. 7, 1947 |
| 2,442,716 | Weisberg et al. | June 1, 1948 |
| 2,464,364 | Atwood | Mar. 15, 1949 |